US012801691B2

(12) United States Patent
Nakao

(10) Patent No.: US 12,801,691 B2
(45) Date of Patent: Nov. 17, 2026

(54) COMPUTER-READABLE RECORDING MEDIUM STORING TENSOR NETWORK CONTRACTION CONTROL PROGRAM, TENSOR NETWORK CONTRACTION CONTROL METHOD, AND INFORMATION PROCESSING APPARATUS

(71) Applicant: Fujitsu Limited, Kawasaki (JP)

(72) Inventor: Takanori Nakao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 683 days.

(21) Appl. No.: 18/472,303

(22) Filed: Sep. 22, 2023

(65) Prior Publication Data

US 2024/0211539 A1 Jun. 27, 2024

(30) Foreign Application Priority Data

Dec. 27, 2022 (JP) ................................ 2022-210565

(51) Int. Cl.
*G06F 17/18* (2006.01)

(52) U.S. Cl.
CPC .................................... *G06F 17/18* (2013.01)

(58) Field of Classification Search
CPC ....................................................... G06F 17/18
See application file for complete search history.

(56) References Cited

U.S. PATENT DOCUMENTS 12,561,368 B2 * 2/2026 Huang ................ G06F 16/9024
2021/0209270 A1 * 7/2021 Huang .................... G06F 17/16
2021/0334313 A1 * 10/2021 Huang ................ G06F 16/9024
2021/0397772 A1 12/2021 Liu et al.

FOREIGN PATENT DOCUMENTS

JP 2022-003501 1/2022

OTHER PUBLICATIONS

L. Gottesbüren et al., "Advanced Flow-Based Multilevel Hypergraph Partitioning", Internet URL: www.sea2020.dmi.unict.it/SLIDES/Gottesburen.pdf, 75 pages, Jun. 5, 2020.

* cited by examiner

*Primary Examiner* — Tarek Elarabi
(74) *Attorney, Agent, or Firm* — Fujitsu Intellectual Property Center

(57) ABSTRACT

A non-transitory computer-readable recording medium stores a tensor network contraction control program for causing a computer to execute a process including: determining whether or not contraction of a tensor network that includes a plurality of tensors coupled to each other is accomplishable in a range of an available memory capacity based on a number of edges included in the tensor network.

9 Claims, 11 Drawing Sheets

COMPUTER-READABLE RECORDING MEDIUM STORING TENSOR NETWORK CONTRACTION CONTROL PROGRAM, TENSOR NETWORK CONTRACTION CONTROL METHOD, AND INFORMATION PROCESSING APPARATUS

CROSS-REFERENCE TO RELATED APPLICATION

This application is based upon and claims the benefit of priority of the prior Japanese Patent Application No. 2022-210565, filed on Dec. 27, 2022, the entire contents of which are incorporated herein by reference.

FIELD

The embodiment discussed herein is related to a non-transitory computer-readable recording medium storing a tensor network contraction control program, a tensor network contraction control method, and an information processing apparatus.

BACKGROUND

A tensor network has a network structure in which a plurality of tensors are coupled to each other. The tensor network is used in various fields such as statistical physics and machine learning. In recent years, the tensor network is also used as a simulator for simulating a quantum circuit of a quantum computer or the like by using a computer (for example, a classical computer) that is not the quantum computer.

Japanese Laid-open Patent Publication No. 2022-003501 is disclosed as related art.

SUMMARY

According to an aspect of the embodiments, a non-transitory computer-readable recording medium stores a tensor network contraction control program for causing a computer to execute a process including: determining whether or not contraction of a tensor network that includes a plurality of tensors coupled to each other is accomplishable in a range of an available memory capacity based on a number of edges included in the tensor network.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the tensor network, a plurality of tensors coupled to each other by coupling lines called edges may be contracted. A procedure of contracting tensors adjacent to each other as one pair is repeated, and thus, the plurality of tensors included in the tensor network may be finally integrated into a single tensor. This obtained single tensor corresponds to an arithmetic operation result such as a desired simulation result.

In a case where a memory capacity for performing an arithmetic operation of the contraction exceeds an available memory capacity in a device, it is difficult to accomplish the arithmetic operation of the contraction of the tensor network. The memory capacity requested for the contraction arithmetic operation changes depending on the contraction order. Therefore, in the related art, after the contraction order is calculated, the memory capacity requested for the contraction arithmetic operation is estimated.

However, if the completion of the calculation of the entire contraction order is waited for, there is a concern that it takes a long time to determine whether or not the contraction arithmetic operation of the tensor network is possible within a range of the available memory capacity.

In one aspect, an object of the present disclosure is to quickly determine whether or not a contraction arithmetic operation of a tensor network is possible within a range of an available memory capacity.

[A] Description about Tensor 201

Figure 1:
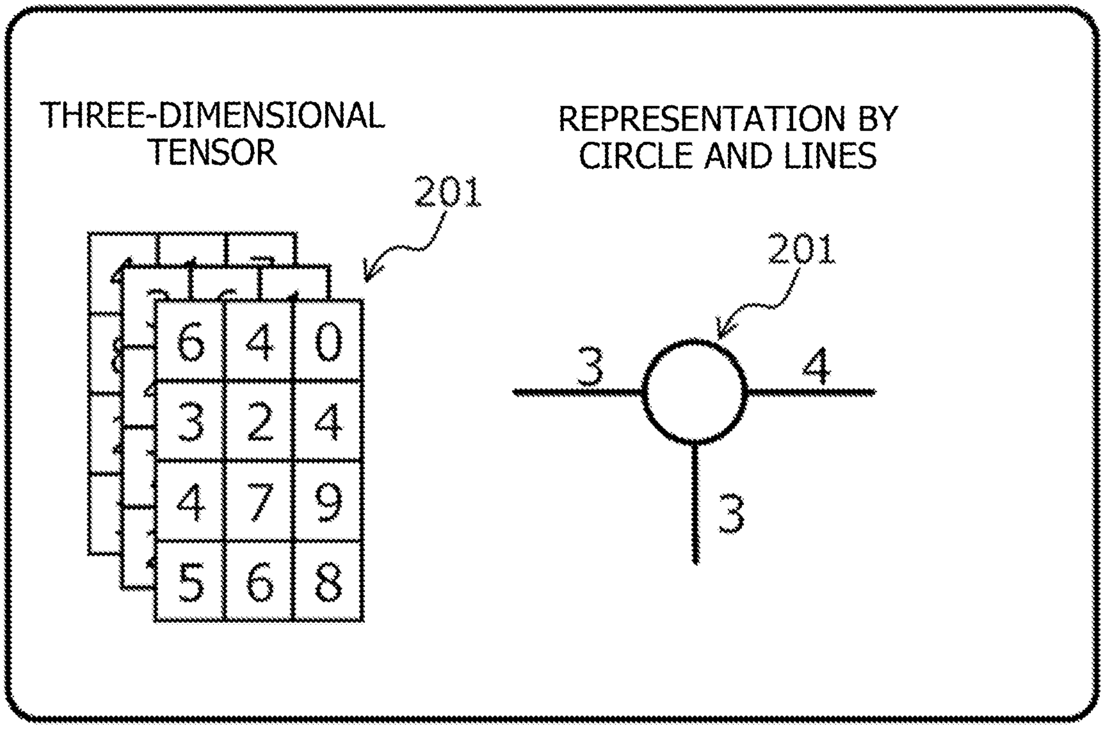
FIG. 1 is a diagram illustrating an example of a tensor and a tensor diagram.

FIG. 1 is a diagram illustrating an example of a tensor 201 and a tensor diagram. An information processing apparatus 1 (see FIG. 7 and the like) of the present embodiment processes a tensor network. The tensor network includes the tensor 201.

The tensor 201 may be a multidimensional array. It is regarded that a vector is a sequence of numbers in one dimension (for example, a rank is 1) and a matrix is a sequence of numbers in two dimensions (for example, a rank is 2), and a generalized sequence of numbers in r dimensions (for example, a rank is r) is the tensor 201. FIG. 1 illustrates the tensor 201 in three dimensions (for example, a rank is 3).

The tensor 201 may be represented by a graphic portion such as a circle and a line extending from the graphic portion. This representation is referred to as the tensor diagram (for example, tensor chart). The graphic portion may indicate a type of the tensor 201. The number of lines indicates a dimension (for example, a rank). In the representation by a circle and lines in FIG. 1, three lines are provided for a three-dimensional tensor. Subscripts (4, 3, and 3 in a clockwise direction from a line on a right side in the example illustrated in FIG. 1) may be written for the three lines. The subscript indicates the number of elements (may also be referred to as an order or a length) of an axis indicated by each line.

Figure 2:
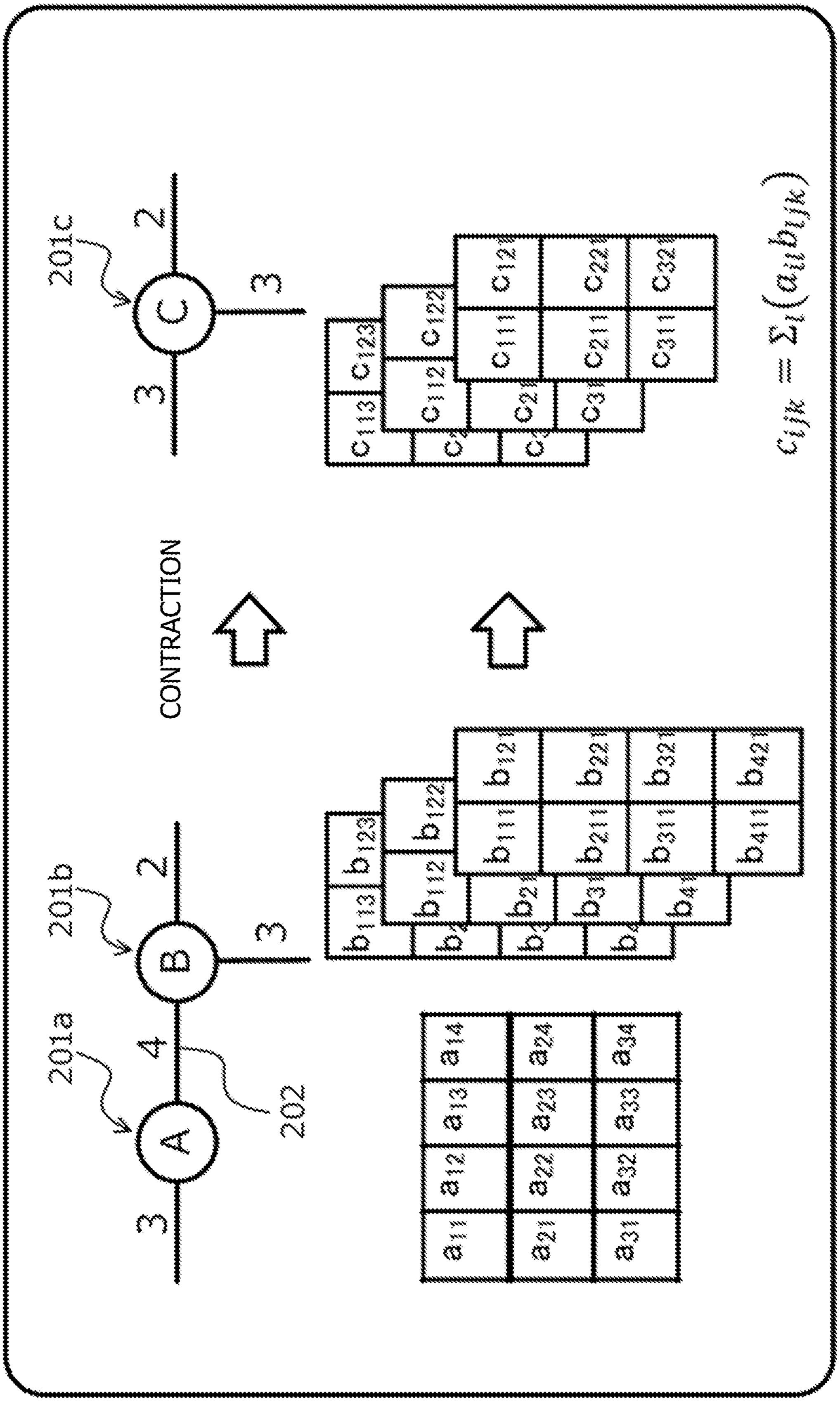
FIG. 2 is a diagram for describing contraction of the tensor.

FIG. 2 is a diagram for describing contraction of the tensor 201. In the tensor diagram, lines of a plurality of tensors (a line of a tensor 201*a* and a line of a tensor 201*b*) may be coupled by a coupling line called an edge 202. The edge 202 couples lines indicating dimensions of the plurality of tensors 201*a* and 201*b* adjacent to each other. In FIG. 2, the plurality of tensors 201*a* (denoted as "tensor A") and 201*b* (denoted as "tensor B") adjacent to each other are in a contraction relationship. The contraction is a generalization of a matrix product. The contraction is an arithmetic operation on one or more tensors 201 resulting from a natural inner product between a vector space having a finite dimension and a dual space thereof. The plurality of tensors 201*a* and 201*b* adjacent to each other are contracted, and thus, one tensor 201*c* (tensor C) may be obtained. In FIG. 2, the tensor 201*c* (tensor C) may be calculated by $c_{ijk}=\Sigma_l(a_{il}b_{ljk})$. i and l are subscripts of elements of the tensor A. l, i, and k are subscripts of elements of the tensor B. $c_{ijk}$ is an element of the tensor C.

[B] Embodiment

[B-1] Description about Contraction Control of Tensor Network 200

Hereinafter, an embodiment will be described with reference to the drawings. The embodiment to be described below is merely illustrative and is not intended to exclude employment of various modification examples or technologies that are not explicitly described in the embodiment. For example, the present embodiment may be implemented by variously modifying the present embodiment within a scope not departing from the gist of the present embodiment. Each drawing is not intended to indicate that only constituent elements illustrated in the drawings are included, and other functions or the like may be included.

Figure 3:
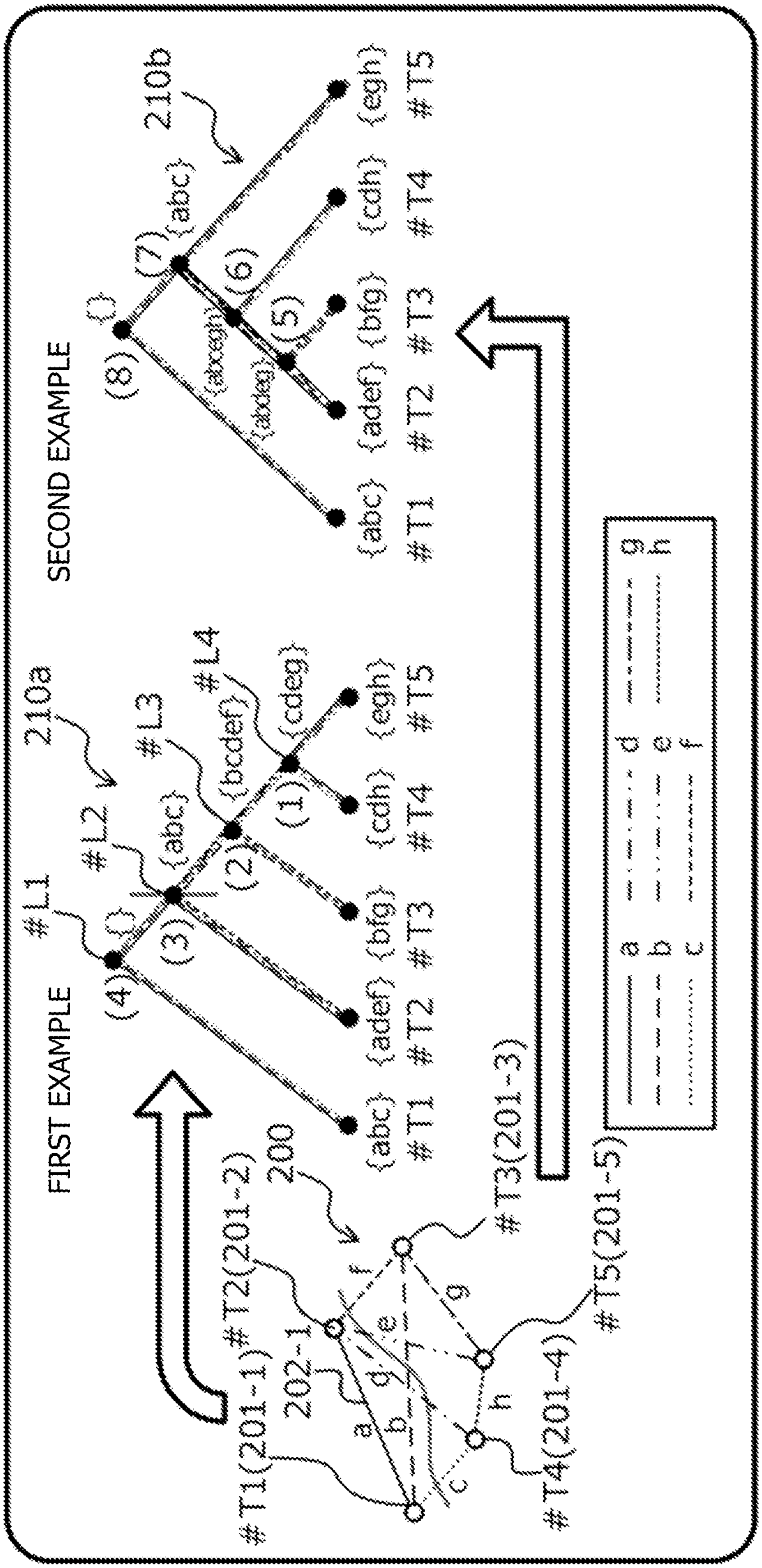
FIG. 3 is a diagram for describing a contraction process of a tensor network.

The information processing apparatus 1 (see FIG. 7 and the like) of the present embodiment executes tensor network contraction control. The tensor network contraction control is control of a contraction process of a tensor network 200. FIG. 3 is a diagram for describing the contraction process of the tensor network 200.

FIG. 3 illustrates the tensor network 200. The tensor network 200 includes a plurality of tensors 201-1 to 201-5 (depicted as tensors #T1 to #T5 and may be collectively referred to as the tensors 201). The tensors 201 adjacent to each other are coupled to each other by edges 202-1 to 202-8 (may be indicated by a to h in the drawing, and may be collectively referred to as the edges 202). The tensors 201 coupled by the edges 202 are in a contraction relationship. Representing the tensor network 200 by one tensor by contracting the plurality of tensors 201 included in the tensor network 200 may be referred to as the contraction (or contraction result) of the tensor network 200.

In the present embodiment, a case where the tensor network 200 is used to simulate a quantum computer will be described as an example. In this case, the tensor network 200 is associated with a quantum circuit (a quantum computer in one example) to be simulated. An expected value in the quantum circuit is simulated as the contraction result of the tensor network 200 associated with the quantum circuit. A method for generating the tensor network 200 corresponding to the quantum circuit based on the quantum circuit serving as the target is similar to that in the related art, and thus, the description thereof will be omitted.

The tensor network 200 is not limited to the tensor network associated with the quantum circuit, and may be used in fields such as statistical mechanics or machine learning. A method for generating the tensor network 200 corresponding to a desired arithmetic operation in statistical mechanics or machine learning is similar to that in the related art, and thus, the description thereof will be omitted.

In a case where the acquired tensor network 200 is contracted, a contraction order is calculated. An estimated memory capacity for contracting the tensor network 200 varies depending on the contraction order. An appropriate contraction order is calculated from among a plurality of possible contraction orders.

The contraction order may be represented as contraction trees 210. FIG. 3 illustrates, as a first example and a second example, a contraction tree 210*a* and a contraction tree 210*b* (may be collectively referred to as the contraction trees 210).

The contraction tree 210*a* may be depicted as a graph that includes, as constituent elements, a root (#L1), nodes (#L2, #L3, and #L4), and leaves (#T1, #T2, #T3, #T4, and #T5) and includes branches coupling constituent elements adjacent to each other. The root (#L1) is a first portion of a branch. Assuming that a root side is an input and a leaf side is an output as viewed from one constituent element, the root is a constituent element having 0 input branches and one or more output branches. The node is a constituent element having one input branch and one or more output branches. The leaf is a constituent element having one input branch and 0 output branches.

The node (#L4) coupled to two leaves (#T5 and #T4 in the first example) via one branch each is searched for. The two leaves (#T5 and #T4) coupled to this node are contracted (process (1)). The leaf (#T5) is the tensor 200-5 to which the edges (egh) are coupled in the tensor network 200, and the leaf (#T4) is the tensor 201-4 to which the edges (cdh) are coupled in the tensor network 201. The common edge h is removed by the contraction, and the tensor #L4 to which the remaining edges (cdeg) are coupled is obtained. The tensor #L4 becomes a new leaf.

Subsequently, the node (#L3) coupled to two leaves (#L4 and #T3) including #L4 that is the new leaf via a branch without a node therebetween is searched for. The tensor #L3 is obtained by contracting the two leaves (#L4 and #T3) (process (2)). The edge g common to #L4 and #T3 is removed, and the remaining edges (bcdef) are coupled to the tensor #L3. Thereafter, likewise, two leaves (#T2 and #L3) are contracted, and the tensor #L2 is obtained (process (3)). Finally, two leaves (#T1 and #L2) are contracted, and the tensor #L1 is obtained (process (4)). As described above, the tensor network 200 is contracted to one tensor #L1, and the contraction result corresponds to the expected value or the like in the quantum circuit.

In the second example, a node coupled to two leaves (#T2 and #T3 in the second example) via a branch each without another node therebetween is also searched for. The two leaves (#T2 and #T3) coupled to this node are contracted (process (5)). This contracted tensor and the tensor #T4 are contracted (process (6)). A result of the process (6) and the tensor #T5 are contracted (process (7)). Finally, a result of the process (7) and the tensor #T1 are contracted. As described above, the tensor network 200 may be contracted to one tensor 201.

Figure 4:
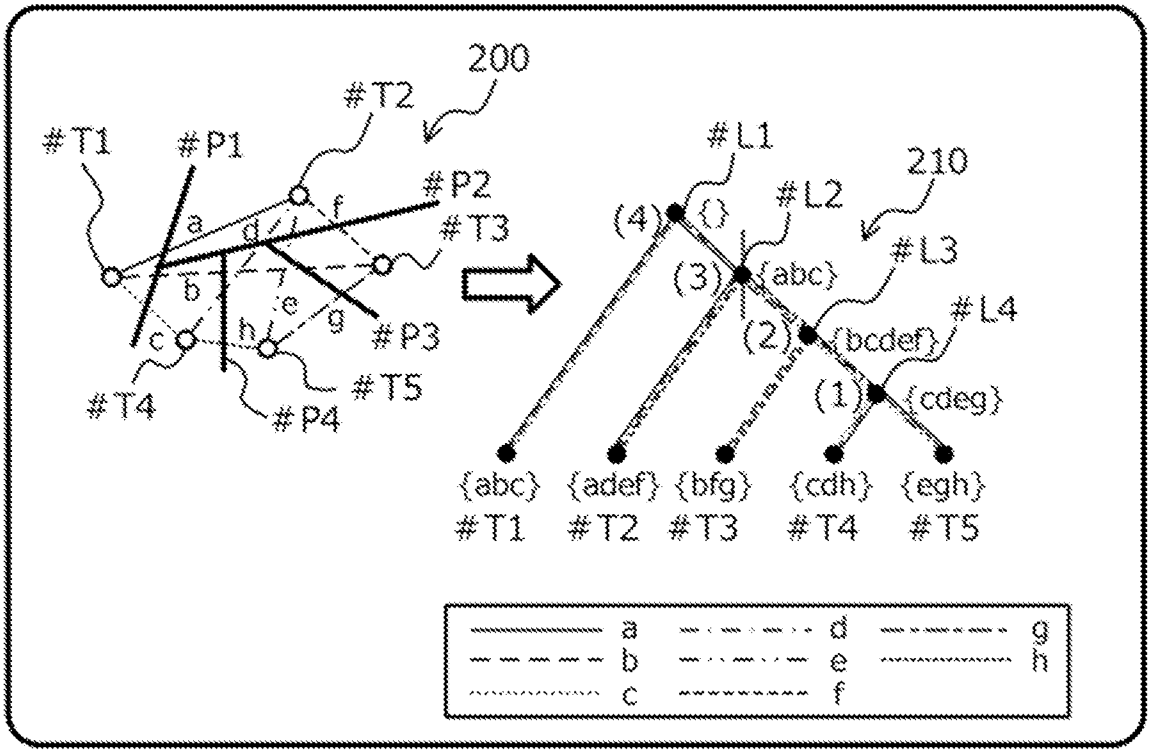
FIG. 4 is a diagram for describing a process of calculating a contraction order of the tensor network.

FIG. 4 is a diagram for describing a process of calculating the contraction order of the tensor network 200. The calculation of the contraction order of the tensor network 200 means, for example, calculation of the contraction tree 210.

For calculating the contraction order, there are a top-down method in which a tree (tree chart) is created from an upper side (root) and a bottom-up method in which a tree is created from a lower side (leaf). In the top-down method, a tree is created by repeatedly partitioning the plurality of tensors 201 into two. In the present embodiment, the top-down method is employed. However, the present disclosure is not limited to the top-down method. As long as the tensor network 200 is partitioned into two groups and the number of edges between the groups is acquired, the contraction control of the tensor network according to the present disclosure may be used.

Since various existing methods may be adopted to determine an order of partitioning the plurality of tensors 201 into two and a position of a partition plane, the detailed description thereof will be omitted. In one example, a method called a flowcutter described in "Advanced Flow-Based Multilevel Hypergraph Partitioning" by Lars Gottesburen et al. (www.sea2020.dmi.unict.it/SLIDES/Gottesburen.pdf) may be used. However, the present embodiment may also be applied to a case where the plurality of tensors 201 are partitioned by using an algorithm other than the flowcutter.

In FIG. 4, the tensor network 200 is partitioned into two, for example, a first subgraph including one tensor #T1 and a second subgraph including the other tensors (#T2 to #T5) by a partition plane #P1. The first subgraph is an example of a first group, and the second subgraph is an example of a second group.

Subsequently, the tensor network (#T2 to #T5) which is a partitionable subgraph is partitioned into two, for example, a subgraph including one tensor #T2 and a subgraph including the remaining tensor network (#T3 to #T5) by a partition plane #P2. In one example, among the partitioned subgraphs, the subgraph including the one tensor #T2 may be added to the first subgraph, and the first subgraph may be updated as a new first subgraph. The remaining tensor network may be updated as a new second subgraph. In this case, the tensor network 200 is partitioned into two, for example, a first subgraph including the tensors #T1 and #T2 and a second subgraph including the other tensors #T3 to #T5.

Subsequently, the tensor network (#T3 to #T5) is partitioned into two, for example, a subgraph including the tensor #T3 and a subgraph including the remaining tensors #T4 and #T5 by a partition plane #P3. In one example, the tensor #T3 is added to the first subgraph. Consequently, the tensor network 200 may be partitioned into two, for example, a first subgraph including the tensors #T1 to #T3 and a second subgraph including the other tensors #T4 and #T5.

Finally, the tensors #T4 and #T5 are partitioned into two, for example, the tensor #T4 and the tensor #T5 by a partition plane #P4. In one example, the tensor #T4 is added to the first subgraph. Consequently, the tensor network 200 is partitioned into two, for example, a first subgraph including the tensors #T1 to #T4 and a second subgraph including the other tensor #T5. At this point in time, since the second subgraph includes only one tensor 201 (#T5), the second subgraph is not partitionable. Accordingly, the process of calculating the contraction order of the tensors 201 is ended.

In the present embodiment, the information processing apparatus 1 determines whether or not the contraction of the tensor network 200 is accomplishable within a range of an available memory capacity based on the number of edges included in the tensor network 200.

For example, it is determined whether or not the estimated memory capacity for contracting the tensor network 200 is equal to or less than a reference value. In one example, it may be determined whether or not the estimated memory capacity is equal to or less than the reference value based on the number (m) of edges that couple a plurality of groups obtained by partitioning the tensor network 200 to include one or more tensors for each. In one example, as illustrated in FIG. 4, the tensor network 200 is partitioned into the plurality of groups in a procedure of the process of calculating the contraction order. It may be determined whether or not the estimated memory capacity is equal to or less than the reference value based on whether or not the number (for example, m) of edges between the plurality of groups is equal to or less than a specific value.

Figure 5:
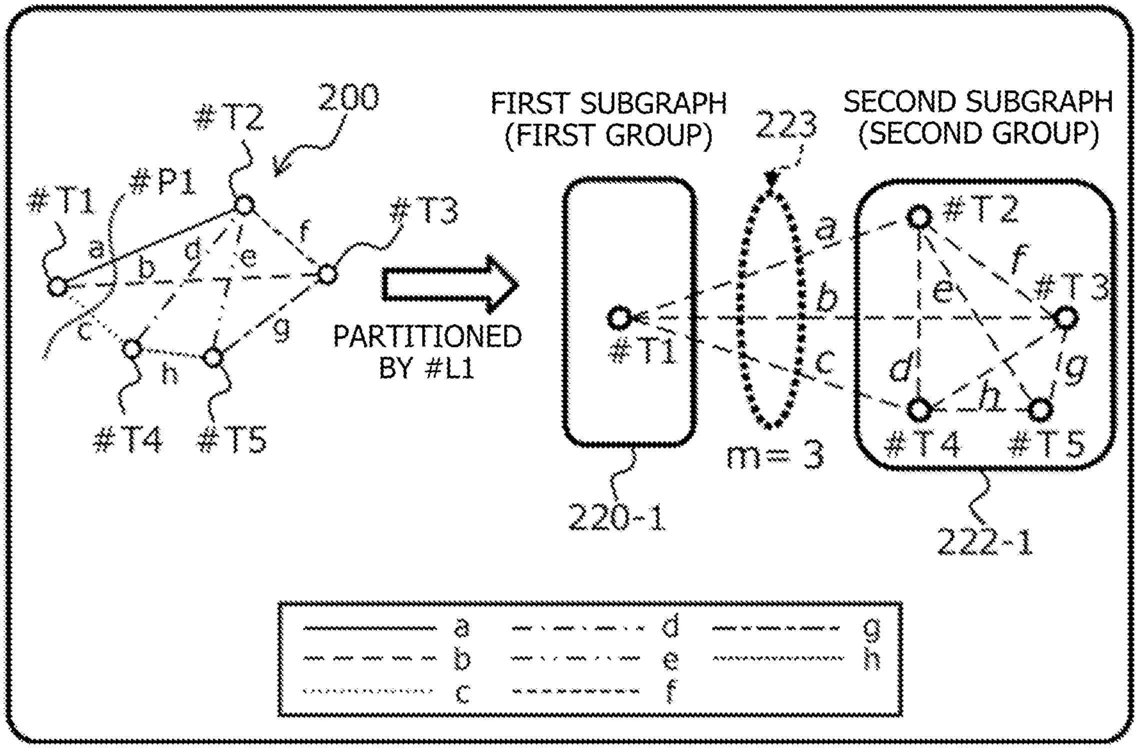
FIG. 5 is a diagram illustrating an example of edges coupling a plurality of subgraphs obtained by partitioning the tensor network.

FIG. 5 is a diagram illustrating an example of edges coupling a plurality of subgraphs obtained by partitioning the tensor network 200 to include one or more tensors for each. FIG. 5 illustrates a state where the tensor network 200 is partitioned into two, for example, a first subgraph 220-1 including the tensor #T1 and a second subgraph 222-1 including the other tensors (#T2 to #T5) by the partition plane #P1 in the procedure of the process of calculating the contraction order. The first subgraph 220-1 and the second subgraph 222-1 are an example of the plurality of groups obtained by partitioning the tensor network 200 to include one or more tensors for each.

In this specification, an edge coupling the first subgraph 220-1 and the second subgraph 222-1 of the tensor network 200 is referred to as an inter-group edge 223. The number of inter-group edges 223 is an example of the number of edges included in the tensor network 200. In FIG. 5, the number (m) of inter-group edges 223 is three edges a, b, and c (m=3). As the calculation of the contraction order progresses, the number and the coupling relationship of the tensors 201 included in a first subgraph 220 (220-1, 220-2, or the like) and the number and the coupling relationship of the tensors 201 included in a second subgraph 222 (222-1, 222-2, or the like) change (see FIGS. 5 and 6). Accordingly, as the calculation of the contraction order progresses, the number of inter-group edges 223 also changes.

In a case where the number (m) of inter-group edges 223 is more than a predetermined value, it is determined that the estimated memory capacity for contracting the tensor network 200 is more than the reference value. In this case, the process of calculating the contraction order described with reference to FIG. 4 is ended without waiting for the completion of the calculation of the entire contraction order.

On the other hand, in a case where the number (m) of inter-group edges 223 is equal to or less than the predetermined value, it is determined that the estimated memory capacity for contracting the tensor network 200 is equal to or less than the reference value. In this case, the process of calculating the contraction order described with reference to FIG. 4 is continued.

For example, a case where the predetermined value is 4 is considered. At a point in time illustrated in FIG. 5, since the number of inter-group edges 223 is 3 and is equal to or less than 4 which is the predetermined value, it is determined that the estimated memory capacity for contracting the tensor network 200 is equal to or less than the reference value. In this case, the process of calculating the contraction order described with reference to FIG. 4 is continued, and the partitioning by the partition plane #P2 is performed next.

Figure 6:
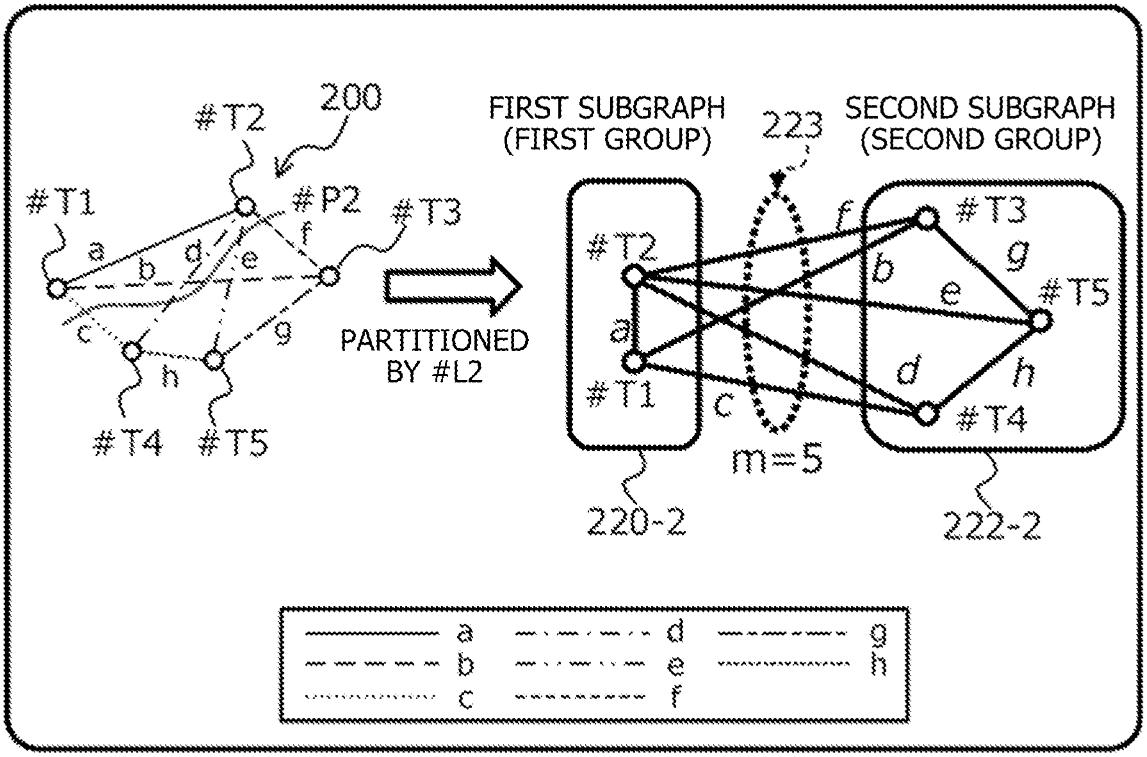
FIG. 6 is a diagram illustrating another example of a plurality of edges coupling a plurality of subgraphs obtained by partitioning the tensor network.

FIG. 6 is a diagram illustrating another example of a plurality of edges coupling a plurality of subgraphs obtained by partitioning the tensor network 200 to include one or more tensors for each. FIG. 6 illustrates a state where the tensor network 200 is partitioned into two, for example, a first subgraph 220-2 including the tensors #T1 and #T2 and a second subgraph 222-2 including the other tensors (#T3 to #T5) by the partition plane #P2. For example, FIG. 6 illustrates a state subsequent to the state illustrated in FIG. 5. At a point in time illustrated in FIG. 6, the number (m) of inter-group edges 223 coupling the first subgraph 220-2 and the second subgraph 222-2 is five edges b, c, d, e, and f (m=5).

In a case where the predetermined value is 4, at the point in time illustrated in FIG. 6, the number of inter-group edges 223 is 5 and is more than 4 which is the predetermined value. Accordingly, it is determined that the estimated memory capacity for contracting the tensor network 200 is more than the reference value. In this case, the process of calculating the contraction order is ended. Accordingly, the subsequent partitioning and the like by the partition planes #P3 and #P4 described with reference to FIG. 4 are not performed.

In a case where it is determined that the estimated memory capacity for contracting the tensor network 200 is more than the reference value, information indicating that the contraction is impossible due to an insufficient memory capacity is output. Accordingly, in a case where the memory capacity is insufficient, since the information indicating that the contraction is impossible is output without waiting for the calculation of the contraction order to be ended, whether or not the contraction arithmetic operation of the tensor network is possible within the range of the available memory capacity may be quickly determined.

[C] Functional Configuration Example

Figure 7:
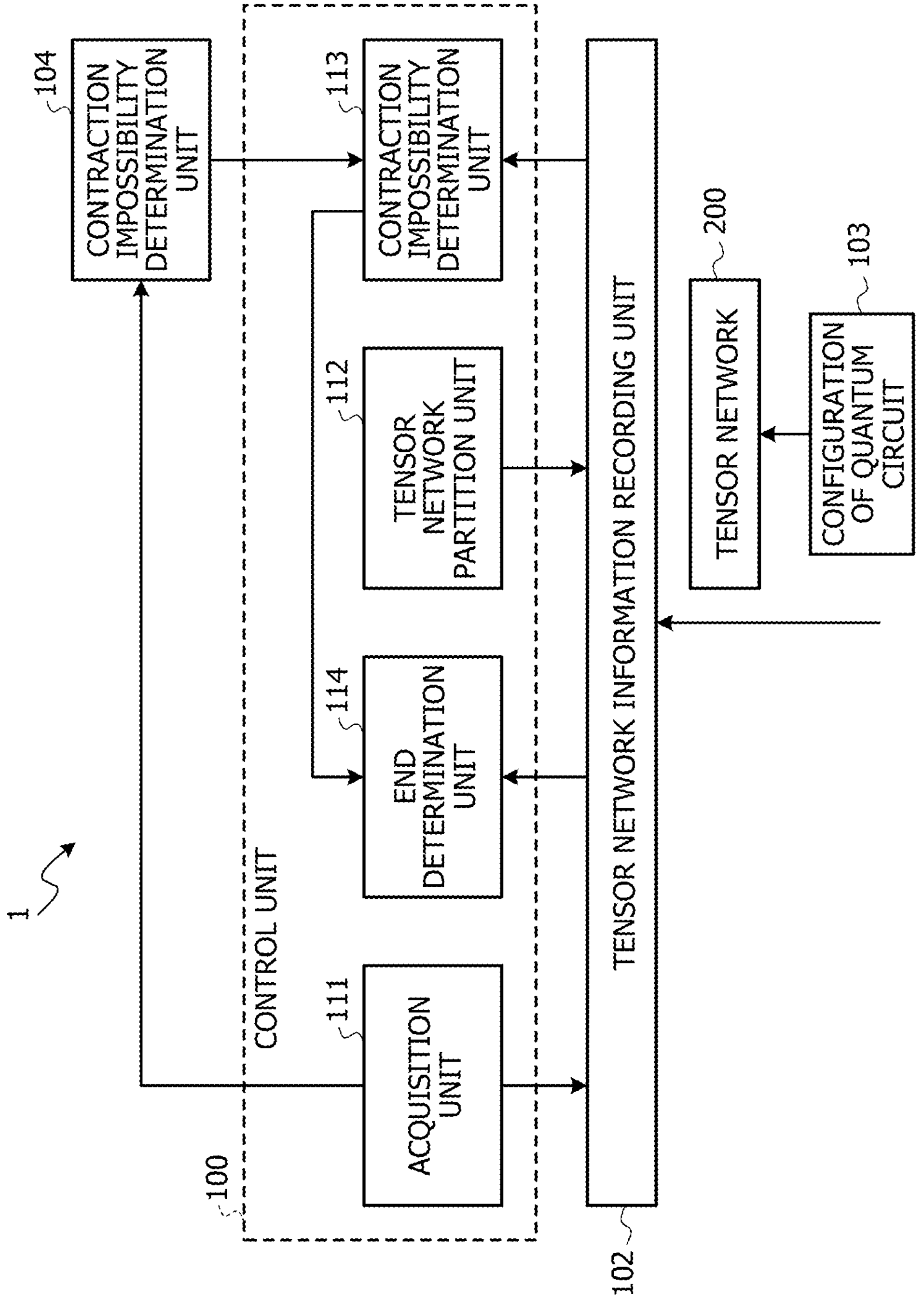
FIG. 7 is a block diagram illustrating a functional configuration example of an information processing apparatus according to an embodiment.

FIG. 7 is a block diagram illustrating a functional configuration example of the information processing apparatus 1 according to the embodiment. The information processing apparatus 1 includes a control unit 100, a tensor network information recording unit 102, and a memory capacity recording unit 104.

The tensor network information recording unit 102 acquires and stores information on the tensor network 200. In one example, the tensor network 200 is generated in association with a configuration 103 of the quantum circuit to be simulated.

The memory capacity recording unit 104 stores information on the memory capacity of hardware available for the information processing apparatus 1 to execute the contraction of the tensor network 200. The available memory capacity of the hardware may be a capacity of a storage area included in one or both of a memory unit 12 and a storage device 14 illustrated in FIG. 8 to be described later. In one example, the available memory capacity of the hardware is $2^n$ bytes, and may be equal to or more than 100 GB and equal to or less than 10 TB. For example, in one example, n is equal to or more than 36 and equal to or less than 44.

The control unit 100 executes the tensor network contraction control described with reference to FIGS. 3 to 6. The control unit 100 may include an acquisition unit 111, a tensor network partition unit 112, a contraction impossibility determination unit 113, and an end determination unit 114.

The acquisition unit 111 acquires the information on the tensor network 200 from the tensor network information recording unit 102. The acquisition unit 111 acquires the information on the available memory capacity of the hardware from the memory capacity recording unit 104.

The tensor network partition unit 112 partitions the acquired tensor network 200 to obtain a plurality of groups, for example, the first subgraph 220 and the second subgraph 222 which are the first group and the second group.

The tensor network partition unit 112 may obtain the first subgraph 220 and the second subgraph 222 by using the result of partitioning the tensor network 200 in the procedure of the process of calculating the contraction order.

In this case, the tensor network partition unit 112 may use at least a part of the procedure of the process of calculating the contraction order, as a partitioning process for obtaining the first subgraph 220 (for example, the first group) and the second subgraph 222 (for example, the second group).

As the procedure of the process of calculating the contraction order progresses, the number and breakdown of the tensors 201 included in each of the first subgraph 220 and the second subgraph 222 change. Accordingly, as the process of calculating the contraction order progresses, the tensor network partition unit 112 appropriately obtains the first subgraph 220 and the second subgraph 222.

In one example, as described with reference to FIG. 4, the tensor network partition unit 112 selects the partitionable subgraph (the second subgraph 222 in one example). The tensor network partition unit 112 partitions the subgraph into two subgraphs according to a certain algorithm.

As the partitioning process progresses, the tensor network partition unit 112 may update contents of the first subgraph 220 and the second subgraph 222. In one example, an algorithm using the method such as the existing flowcutter mentioned above may be used to determine the partitioning order and position. However, an algorithm using a method other than the flowcutter may be used.

The contraction impossibility determination unit 113 determines whether or not the contraction of the tensor network 200 is accomplishable within the available memory capacity based on the number of edges included in the tensor network 200. The number of edges may be the number (for example, m) of inter-group edges 223 coupling the first subgraph 220 and the second subgraph 222 obtained by the tensor network partition unit 112.

The contraction impossibility determination unit 113 determines whether or not the estimated memory capacity for contracting the tensor network 200 is equal to or less than the reference value based on the number of edges included in the tensor network 200. In one example, the contraction impossibility determination unit 113 determines whether or not the estimated memory capacity is equal to or less than the reference value based on the number of inter-group edges 223. In a case where the number of inter-group edges 223 is more than the specific value, the contraction impossibility determination unit 113 may determine that the estimated memory capacity is more than the reference value.

Assuming that the number of inter-group edges 223 is m and the number of elements in each dimension (axis) of the tensor 201 is q, the memory capacity for contracting two subgraphs (for example, the first subgraph 220 and the second subgraph 222) is a value $q^{2m}\times2^a$ (bytes) obtained by multiplying a value $q^{2m}$ obtained by setting twice the number m of inter-group edges as an exponent of the number of elements by a value $2^a$ that is the number of memories for numerical representation. In the tensor network 200 generated in association with the quantum circuit, the number of elements in each dimension (axis) of each tensor 201 is 2. In this case, the contraction impossibility determination unit 113 determines that a memory capacity of $2^{2m+a}$ (bytes) is to be used to contract two subgraphs (for example, the first subgraph 220 and the second subgraph 222). a is a constant determined by the number of bytes of a numerical value used for calculation. In one example, a=8 in a case where a numerical representation of a computer is a double-precision floating-point number, and a=4 in a case where the numerical representation of the computer is a single-precision floating-point number. For example, the contraction impossibility determination unit 113 calculates the estimated memory capacity for contracting the tensor network 200 to be at least $2^{2m+a}$ (bytes).

In the case of $2^{2m+a}>2^n$, for example, in the case of 2m+a>n, it may be determined that the memory capacity for contracting the tensor 201 included in the first subgraph 220 and the tensor 201 included in the second subgraph 222 may not be secured. In a case where the entire tensor network 200 is contracted, a larger memory capacity is to be used than in a case where the tensor 201 included in the first subgraph 220 and the tensor 201 included in the second subgraph 222 are contracted. Accordingly, the contraction impossibility determination unit 113 may determine that there is no possibility of contracting the tensor network 200 within the available memory capacity.

2m+a>n may be modified to m>(n−a)/2. Accordingly, the above determination means that it is determined that the estimated memory capacity is more than the reference value in a case where m is more than the specific value. In this case, (n−a)/2 serves as the specific value determined by the memory capacity of the hardware available for executing the contraction of the tensor network 200. The specific value is not limited to this case, and may be different depending on the number of elements, numerical representation, other safety factors, and the like.

In a case where it is determined that the contraction is impossible, the contraction impossibility determination unit 113 causes a display control unit 13 to be described later with reference to FIG. 8 to display information indicating that the contraction is impossible on a display device 130.

The end determination unit 114 determines whether to end or continue the process of calculating the contraction order. The end determination unit 114 determines whether or not the second subgraph 222 is partitionable. In one example, in a case where the number of tensors 201 included in the second subgraph 222 is one and partitioning is not possible any more, the end determination unit 114 determines that the process of calculating the entire contraction order is completed.

Even before the process of calculating the entire contraction order is completed, in a case where it is determined that the estimated memory capacity is more than the reference value, the end determination unit 114 ends the calculation of the contraction order. In a case where it is determined that the estimated memory capacity is equal to or less than the reference value, the end determination unit 114 continues the calculation of the contraction order.

The end determination unit 114 may acquire the number (for example, m) of inter-group edges 223, and may end the process of calculating the contraction order even in the middle of the procedure of the process of calculating the contraction order in a case where m is more than the specific value, for example, (n−a)/2.

[D] Hardware Configuration Example

Figure 8:
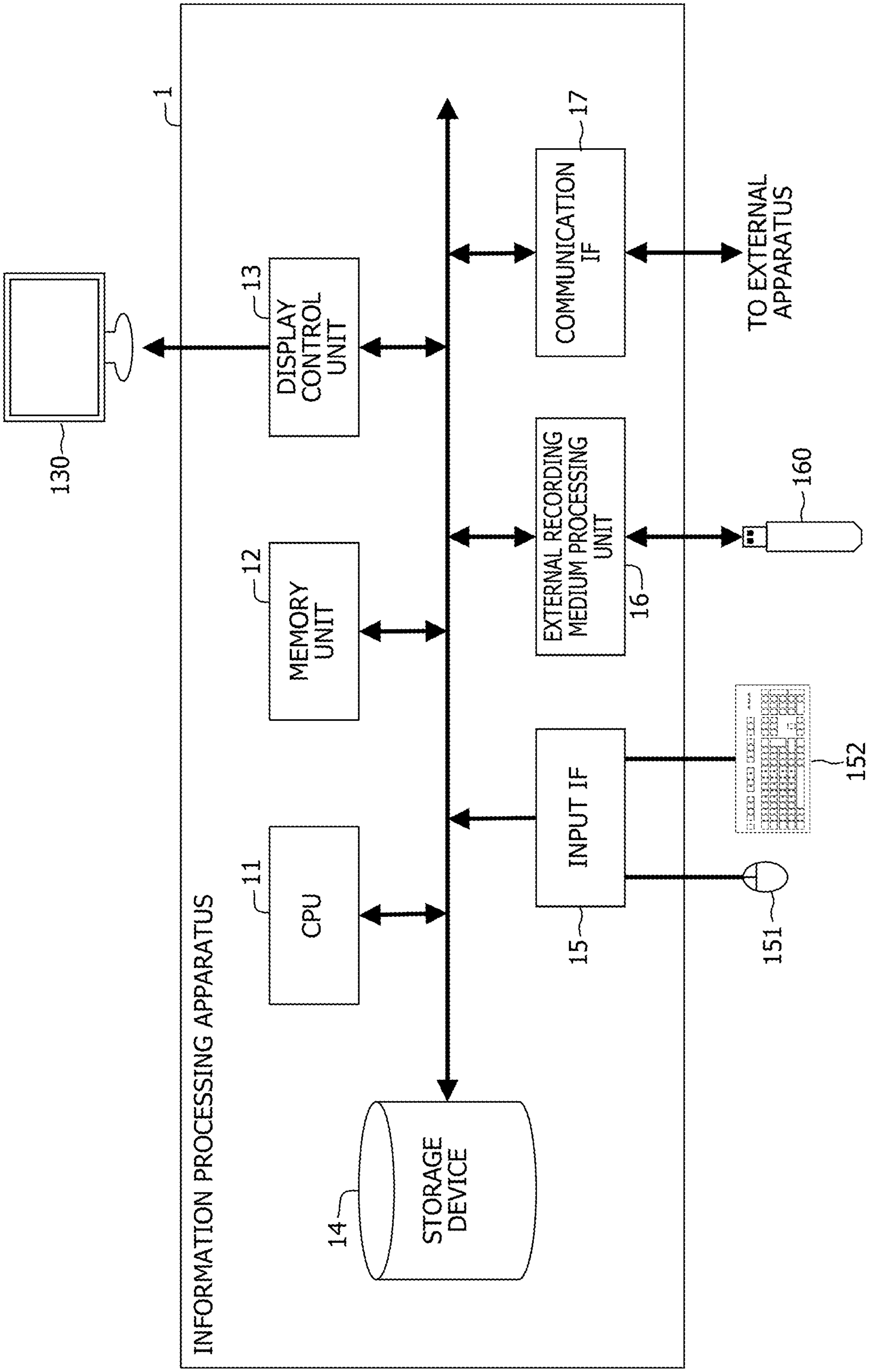
FIG. 8 is a block diagram illustrating a hardware (HW) configuration example of a computer that implements functions of the information processing apparatus according to the embodiment.

FIG. 8 is a block diagram illustrating a hardware (HW) configuration example of a computer that implements functions of the information processing apparatus 1 according to the embodiment.

As illustrated in FIG. 8, the information processing apparatus 1 includes a central processing unit (CPU) 11, the memory unit 12, the display control unit 13, the storage device 14, an input interface (IF) 15, an external recording medium processing unit 16, and a communication IF 17.

The memory unit 12 is an example of a storage unit and includes, for example, a read-only memory (ROM), a random-access memory (RAM), and the like. A program such as a Basic Input/Output System (BIOS) may be written in the ROM of the memory unit 12. A software program in the memory unit 12 may be appropriately read and executed by the CPU 11. The RAM of the memory unit 12 may be used as a temporary recording memory or as a working memory.

The display control unit 13 is coupled to the display device 130 and controls the display device 130. The display device 130 is a liquid crystal display, an organic light-emitting diode (OLED) display, a cathode ray tube (CRT) display, an electronic paper display, or the like and displays various kinds of information for an operator or the like. The display device 130 may be a device combined with an input device, and may be, for example, a touch panel.

The storage device 14 is a storage device with high IO performance, and, for example, a dynamic random-access memory (DRAM), a solid-state drive (SSD), a storage class memory (SCM), or a hard disk drive (HDD) may be used.

The input IF 15 may be coupled to input devices such as a mouse 150 and a keyboard 152, and may control the input devices such as the mouse 150 and the keyboard 152. The mouse 150 and the keyboard 152 are an example of the input devices, and the operator performs various input operations via these input devices.

The external recording medium processing unit 16 is configured such that a recording medium 160 is attachable thereto. The external recording medium processing unit 16 is configured to be able to read information recorded in the recording medium 160 in a state where the recording medium 160 is attached thereto. In this example, the recording medium 160 has portability. For example, the recording medium 160 is a flexible disk, an optical disc, a magnetic disk, a magneto-optical disk, a semiconductor memory, or the like.

The communication IF 17 is an interface that enables communication with an external apparatus.

The CPU 11 is an example of a processor (for example, a computer), and is a processing device that performs various controls and arithmetic operations. The CPU 11 executes an operating system (OS) and a program (tensor network contraction control program) read into the memory unit 12, and thus implements various functions. The CPU 11 may be a multiprocessor including a plurality of CPUs, a multi-core processor including a plurality of CPU cores, or a configuration including a plurality of multi-core processors.

The device that controls the operations of the entire information processing apparatus 1 is not limited to the CPU 11 and may be, for example, any one of an MPU, a DSP, an ASIC, a PLD, and an FPGA. The device that controls the operations of the entire information processing apparatus 1 may be a combination of two or more types of a CPU, an MPU, a DSP, an ASIC, a PLD, and an FPGA. The MPU is an acronym for a microprocessor unit. The DSP is an acronym for a digital signal processor. The ASIC is an acronym for an application-specific integrated circuit. The PLD is an acronym for a programmable logic device. The FPGA is an acronym for a field-programmable gate array.

[E] Operation Example

Figure 9:
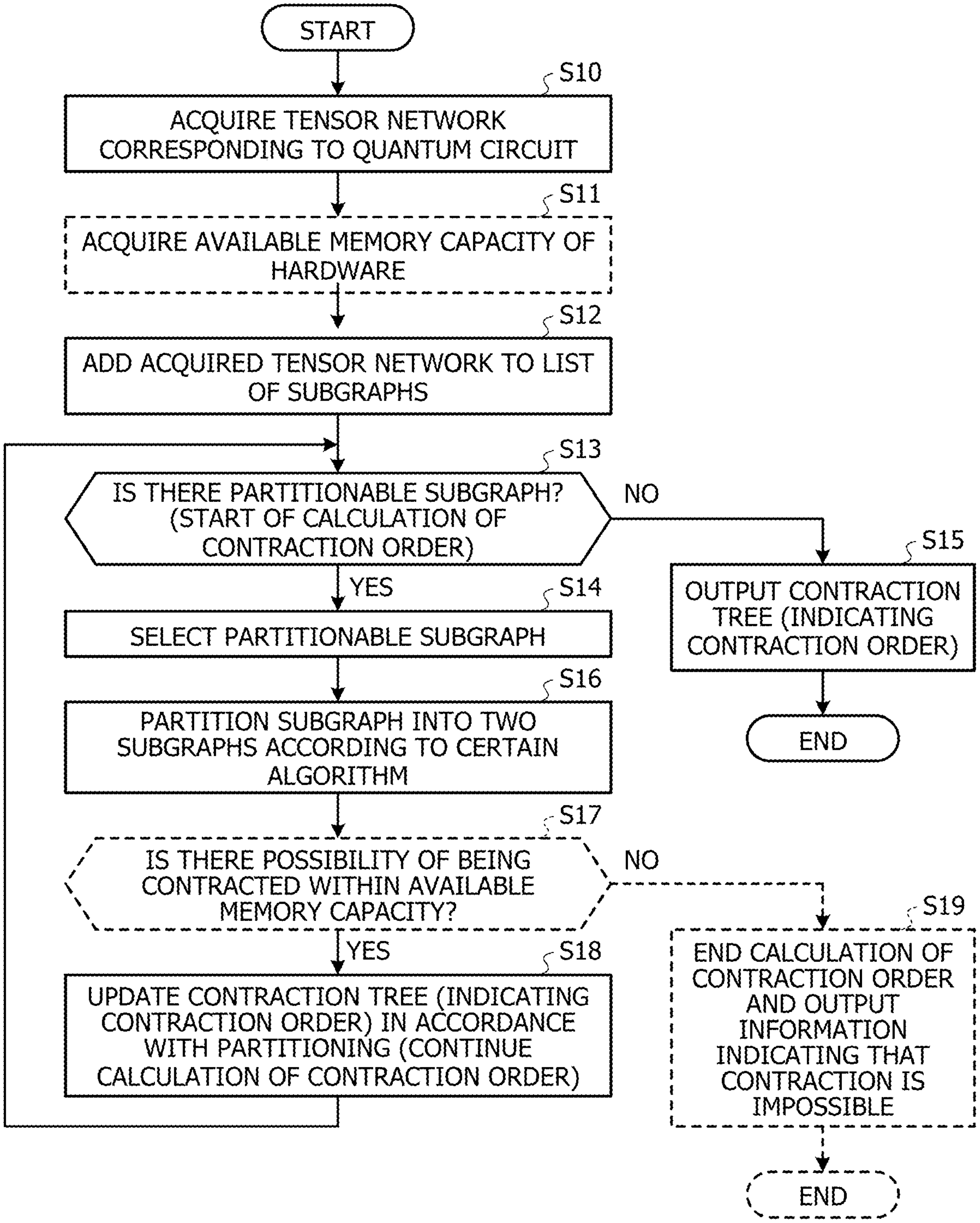
FIG. 9 is a flowchart illustrating an example of an operation by the information processing apparatus according to the embodiment.

FIG. 9 is a flowchart illustrating an example of operations by the information processing apparatus 1 according to the embodiment.

The acquisition unit 111 acquires the information on the tensor network 200 from the tensor network information recording unit 102 (step S10).

The acquisition unit 111 acquires the information on the available memory capacity of the hardware from the memory capacity recording unit 104 (step S11).

The tensor network partition unit 112 adds the acquired tensor network 200 to a list of subgraphs (step S12). In the present embodiment, the tensor network 200 may also be an example of the subgraph.

The end determination unit 114 determines whether or not there is the partitionable subgraph in the list (step S13). The processing of step S13, step S14, and step S16 may be part of the process of calculating the contraction order. Accordingly, step S13 corresponds to the start of the process of calculating the contraction order.

In a case where there is the partitionable subgraph (see YES route in step S13), the tensor network partition unit 112 selects the partitionable subgraph (step S14). Taking FIG. 4 as an example, at first, the tensor network 200 itself is added as the subgraph (graph). The tensor network 200 itself is selected as the partitionable subgraph (graph).

On the other hand, in a case where there is no partitionable subgraph (see NO route in step S13), the end determination unit 114 determines that the calculation of the entire contraction order is completed. In one example, in a case where there is no subgraph including the plurality of tensors 201, since partitioning is not possible any more, the end determination unit 114 determines that the calculation of the entire contraction order is completed. In this case, the tensor network partition unit 112 outputs the contraction tree indicating the contraction order (step S15).

The tensor network partition unit 112 partitions the selected subgraph into two subgraphs according to a certain algorithm (step S16). At first, the tensor network 200 itself is selected as the partitionable subgraph (graph).

The tensor network 200 itself is partitioned into the first subgraph 220-1 including the tensor #T1 and the second subgraph 222-1 including the other tensors (#T2 to #T5) by the partition plane #P1.

In a case where there is a possibility that the tensor network 200 may be contracted within the available memory capacity (see YES route in step S17), the tensor network partition unit 112 updates the contraction tree (indicating the contraction order) in accordance with the partitioning (step S18). For example, in a case where there is the possibility that the tensor network 200 may be contracted (see the YES route in step S17), the tensor network partition unit 112 continues the process of calculating the contraction order.

In a case where there is no possibility that the tensor network 200 may be contracted within the available memory capacity (see the NO route in step S17), the end determination unit 114 ends the calculation of the contraction order and outputs information indicating that the contraction of the tensor network 200 is impossible (step S19). The control unit 100 ends the tensor network contraction control. The determination of step S17 may be performed by the contraction impossibility determination unit 113. The processing contents of the contraction impossibility determination unit 113 will be described later.

In a case where the process of calculating the contraction order is continued, the end determination unit 114 determines again whether or not there is the partitionable subgraph (or graph) (step S13). In the example illustrated in FIG. 4, among the first subgraph 220-1 including the tensor #T1 and the second subgraph 222-1 including the other tensors (#T2 to #T5), the second subgraph 222-1 is partitionable. Accordingly, the end determination unit 114 determines that there is the partitionable subgraph (see YES route in step S13).

The tensor network partition unit 112 partitions the selected subgraph (#T2 to #T5) into two subgraphs by the partition plane #P2 according to the certain algorithm (step S16).

In one example, the tensor network partition unit 112 may partition the selected subgraph (#T2 to #T5) into a portion including one tensor #T2 and a portion including the remaining tensors (#T3 to #T5). The tensor network partition unit 112 may add the portion including the one tensor #T2 obtained by the partitioning to the first subgraph 220 to update the first subgraph 220 as a new first subgraph. The tensor network partition unit 112 may update the portion including the remaining tensors (#T3 to #T5) as a new second subgraph 222.

As long as there is the possibility of being contracted within the available memory capacity (YES route in step S17), the tensor network partition unit 112 repeats the processing of steps S18, S13, S14, and S16 until there is no subgraph including the plurality of tensors 201.

In a case where there is no possibility of being contracted within the available memory capacity (NO route in step S17), the end determination unit 114 ends the process of calculating the contraction order (step S19) even though there is the subgraph including the plurality of tensors 201. The end determination unit 114 outputs the information that contraction of the tensor network 200 is not impossible within the range of the available memory capacity (step S19). For example, the end determination unit 114 may output the information on whether or not the contraction of the tensor network 200 is accomplishable within the range of the available memory capacity without waiting for the completion of the calculation of the contraction order (for example, the completion of the contraction tree).

Figure 10:
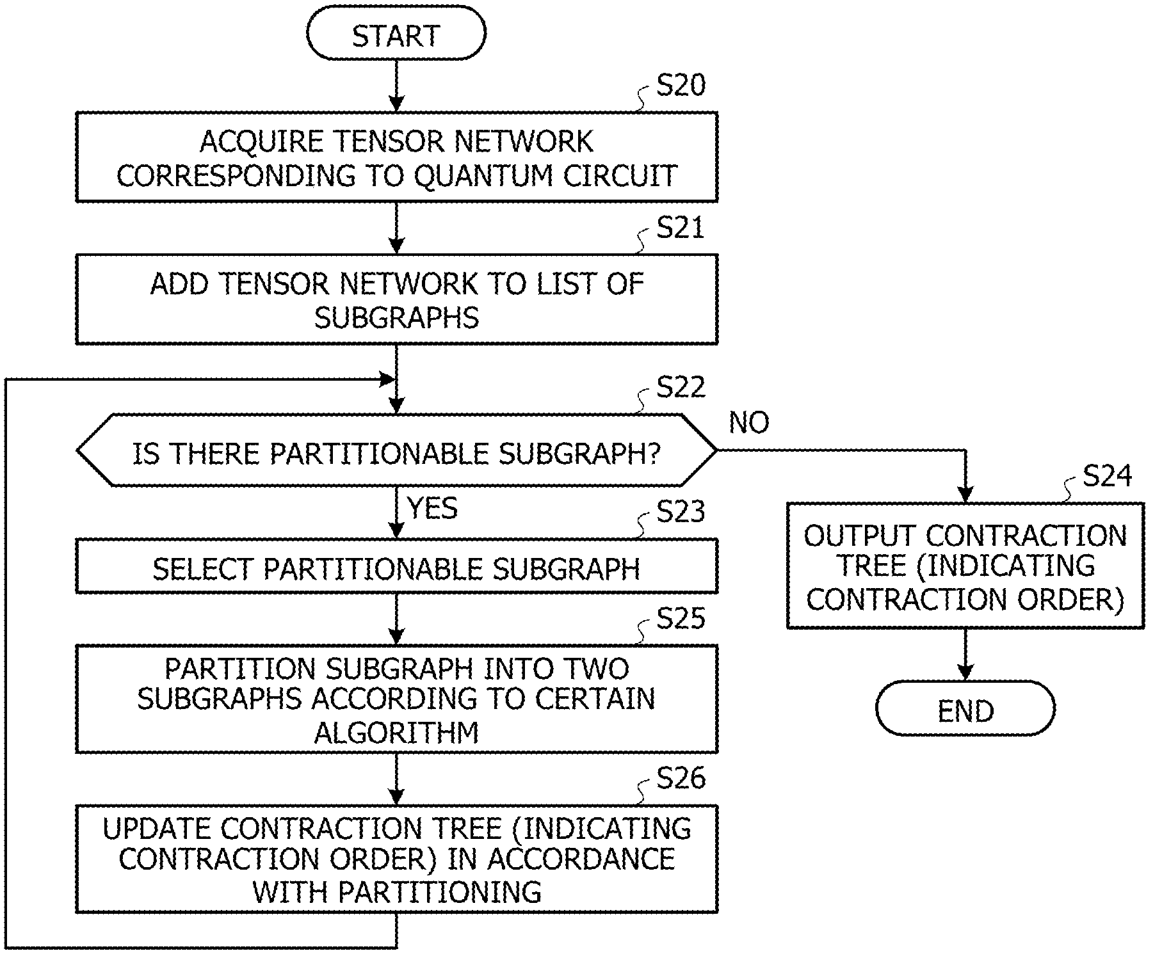
FIG. 10 is a flowchart illustrating an example of an operation by an information processing apparatus according to a comparative example.

FIG. 10 is a flowchart illustrating an example of an operation by an information processing apparatus according to a comparative example. A configuration of the comparative example may be similar to the configuration illustrated in FIG. 7 except that the contraction impossibility determination unit 113 in FIG. 7 is not included.

In the information processing apparatus according to the comparative example, the processing of steps S11, S17, and S19 indicated by dotted lines in the flowchart of FIG. 9 is omitted. The processing of steps S20 to 26 in FIG. 10 are similar to the processing of steps S10, S12 to S16, and S18 in FIG. 9.

In the case of the information processing apparatus according to the comparative example illustrated in FIG. 10, the process of calculating the contraction order is continued until there is no subgraph including the plurality of tensors 201 and the subgraph may not be partitioned any more, and the calculation of the contraction order is completed. Settlement of the memory capacity for the contraction in response to the completion of the calculation of the entire contraction order is waited for, and whether or not the contraction arithmetic operation of the tensor network 200 is possible is output.

In the case of the information processing apparatus 1 according to the embodiment illustrated in FIG. 9, whether or not the contraction arithmetic operation of the tensor network is possible within the range of the available memory capacity may be quickly output without waiting for the completion of the calculation of the entire contraction order.

Figure 11:
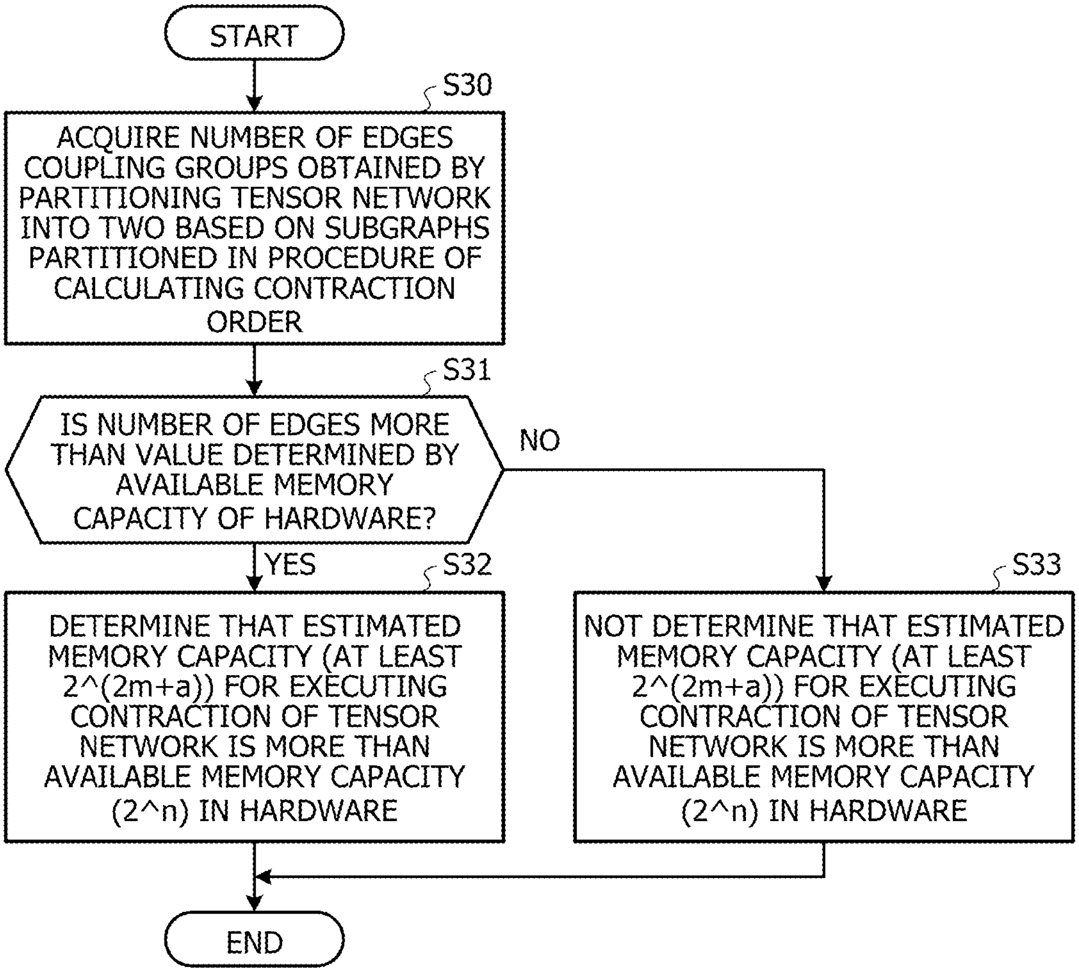
FIG. 11 is a flowchart illustrating an example of a process of determining whether or not an estimated memory capacity for contraction is equal to or less than a reference value in the information processing apparatus according to the embodiment.

FIG. 11 is a flowchart illustrating an example of a process of determining whether or not the estimated memory capacity for contraction is equal to or less than the reference value in the information processing apparatus 1 according to the embodiment.

The process in FIG. 11 is an example of a process of determining whether or not the contraction of the tensor network 200 is accomplishable within the available memory capacity in FIG. 9.

The contraction impossibility determination unit 113 acquires the number of inter-group edges 223 coupling the groups obtained by partitioning the tensor network 200 into two based on the subgraphs (step S16 in FIG. 9) partitioned in the process of calculating the contraction order (step S30). An example of the inter-group edges 223 is illustrated in FIGS. 5 and 6. The partitioned two groups may be the first subgraph 220 and the second subgraph 222.

The contraction impossibility determination unit 113 determines whether or not m which is the number of inter-group edges 223 is more than a value determined by an available memory capacity ($2^n$) of hardware, for example, (n−a)/2 (where a is a constant determined by the number of bytes of the numerical value used for calculation) (step S31).

In a case where m is more than this value (see YES route in step S31), it is determined that the estimated memory capacity for executing the contraction of the tensor network 200 is more than $2^n$ (bytes) which is the available memory capacity of the hardware (step S32). The estimated memory capacity is calculated to be at least $2^{2m+a}$ (bytes).

Accordingly, the contraction impossibility determination unit 113 estimates that a possibility that the tensor network 200 may be contracted within the available memory capacity is low. As a result, as described above, the end determination unit 114 ends the calculation of the contraction order, and outputs the information indicating that the contraction of the tensor network 200 is not accomplishable within the range of the available memory capacity.

In a case where m is equal to or less than this value (see the NO route in step S31), it is not determined that the estimated memory capacity for executing the contraction of the tensor network 200 is obviously more than the available memory capacity in the hardware (step S33). Accordingly, the contraction impossibility determination unit 113 does not estimate that the possibility that the tensor network 200 may be contracted within the available memory capacity is low. As a result, the tensor network partition unit 112 continues the calculation of the contraction order.

[F] Effects

According to one example of the aforementioned embodiment, for example, the following operation effects may be achieved.

The control unit 100 determines whether or not contraction of the tensor network 200 that includes the plurality of tensors 201 coupled to each other is accomplishable within a range of an available memory capacity based on the number of edges included in the tensor network 200.

Consequently, whether or not the contraction arithmetic operation of the tensor network 200 is possible within the range of the available memory capacity may be quickly determined.

The number of edges is the number of inter-group edges 223 that couple a plurality of groups obtained by partitioning the tensor network 200 to include one or more tensors for each.

Consequently, the number of edges 202 acquired in order to determine whether or not the contraction arithmetic operation of the tensor network 200 is possible within the range of the available memory capacity may be limited, and the load applied to the determination process may be reduced.

In the process of determining whether or not the contraction is accomplishable, the control unit 100 determines whether or not an estimated memory capacity for contracting the tensor network 200 is equal to or less than a reference value based on the number of edges.

Consequently, whether or not the estimated memory capacity is equal to or less than the reference value may be quickly determined.

The control unit 100 starts calculation of a contraction order of the tensor network 200. The control unit 100 continues the calculation of the contraction order in a case where it is determined that the estimated memory capacity is equal to or less than the reference value. The control unit 100 outputs information that indicates that the contraction of the tensor network is not accomplishable and ends the calculation of the contraction order in a case where it is determined that the estimated memory capacity is more than the reference value.

Consequently, even in the middle of the calculation of the contraction order, whether or not the contraction arithmetic operation of the tensor network 200 is possible within the range of the available memory capacity may be quickly determined. In a case where it is determined that the estimated memory capacity is equal to or less than the reference value, the subsequent calculation of the contraction order may be omitted. Accordingly, the processing load may be reduced.

The control unit 100 obtains the plurality of groups by partitioning the tensor network 200 in a procedure of the process of calculating the contraction order.

Consequently, the partitioning process generated in the procedure of the process of calculating the contraction order may be used to determine whether or not the estimated memory capacity is equal to or less than the reference value. Accordingly, the processing load may be reduced as compared with the case where the partitioning process is performed separately from the process of calculating the contraction order. As the process of calculating the contraction order progresses, the number and the coupling relationship of the tensors included in the plurality of groups may be newly acquired. Thus, the accuracy of determining whether or not the estimated memory capacity is equal to or less than the reference value may be increased.

The tensor network 200 is associated with a quantum circuit to be simulated. In the process of determining whether or not the estimated memory capacity is equal to or less than the reference value based on the number of edges, the control unit 100 calculates the estimated memory capacity to be equal to or more than at least $2^{2m+a}$ in a case where the number of edges that couple the plurality of groups is m. a is a constant.

Consequently, even in the middle of the calculation of the contraction order, at least a requested level as the available memory capacity may be quickly known.

[G] Others

The disclosed technology is not limited to the aforementioned embodiment but may be carried out with various modifications within a scope not departing from the gist of the present embodiment. The configurations and processes of the present embodiment may be employed or omitted as desired or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a tensor network contraction control program for causing a computer to execute a process comprising:

determining whether or not contraction of a tensor network that includes a plurality of tensors coupled to each other is accomplishable in a range of an available memory capacity based on a number of edges included in the tensor network;

wherein the number of edges is a number of edges that couple a plurality of groups obtained by partitioning the tensor network to include one or more tensors for each:

wherein in the process of determining whether or not the contraction is accomplishable, the computer is caused to further execute a process of determining whether or not an estimated memory capacity for contracting the tensor network is equal to or less than a reference value based on the number of edges;

Wherein the tensor network is associated with a quantum circuit to be simulated, and in the process of determining whether or not the estimated memory capacity is equal to or less than the reference value based on the number of edges, the computer is caused to further execute a process of calculating the estimated memory capacity to be equal to or more than at least $2^{2m+a}$ where a is a constant and m is the number of edges that couple the plurality of groups.

2. The non-transitory computer-readable recording medium according to claim 1, wherein the computer is caused to further execute a process of starting calculation of a contraction order of the tensor network, and continuing the calculation of the contraction order in a case where it is determined that the estimated memory capacity is equal to or less than the reference value, and outputting information that indicates that the contraction of the tensor network is not accomplishable and ending the calculation of the contraction order in a case where it is determined that the estimated memory capacity is more than the reference value.

3. The non-transitory computer-readable recording medium according to claim 2, wherein the computer is caused to further execute a process of obtaining the plurality of groups by partitioning the tensor network in a procedure of the process of calculating the contraction order.

4. A tensor network contraction control method comprising a process of:

determining whether or not contraction of a tensor network that includes a plurality of tensors coupled to each other is accomplishable in a range of an available memory capacity based on a number of edges included in the tensor network;

wherein the number of edges is a number of edges that couple a plurality of groups obtained by partitioning the tensor network to include one or more tensors for each;

wherein the process of determining whether or not the contraction is accomplishable further includes executing a process of determining whether or not an estimated memory capacity for contracting the tensor network is equal to or less than a reference value based on the number of edges;

wherein the tensor network is associated with a quantum circuit to be simulated, and the process of determining whether or not the estimated memory capacity is equal to or less than the reference value based on the number of edges further includes executing a process of calculating the estimated memory capacity to be equal to or more than at least $2^{2m+a}$, where a is a constant and m is the number of edges that couple the plurality of groups.

5. The tensor network contraction control method according to claim 4, further comprising:

starting calculation of a contraction order of the tensor network;

continuing the calculation of the contraction order in a case where it is determined that the estimated memory capacity is equal to or less than the reference value; and outputting information that indicates that the contraction of the tensor network is not accomplishable and ending the calculation of the contraction order in a case where it is determined that the estimated memory capacity is more than the reference value.

6. The tensor network contraction control method according to claim 5, further comprising:

obtaining the plurality of groups by partitioning the tensor network in a procedure of the process of calculating the contraction order.

7. A tensor network contraction control apparatus comprising:

a memory; and a processor coupled to the memory and configured to execute a process comprising:

determine whether or not contraction of a tensor network that includes a plurality of tensors coupled to each other is accomplishable in a range of an available memory capacity based on a number of edges included in the tensor network;

wherein the number of edges is a number of edges that couple a plurality of groups obtained by partitioning the tensor network to include one or more tensors for each;

wherein the process to determine whether or not the contraction is accomplishable further includes executing a process of determining whether or not an estimated memory capacity for contracting the tensor network is equal to or less than a reference value based on the number of edges;

wherein the tensor network is associated with a quantum circuit to be simulated, and in the process of determining whether or not the estimated memory capacity is equal to or less than the reference value based on the number of edges, the processor executes a process of calculating the estimated memory capacity to be equal to or more than at least $2^{2m+a}$, where a is a constant, and m the number of edges that couple the plurality of groups.

8. The information processing apparatus according to claim 7, wherein the processor:

starts calculation of a contraction order of the tensor network, and continues the calculation of the contraction order in a case where it is determined that the estimated memory capacity is equal to or less than the reference value, and outputs information that indicates that the contraction of the tensor network is not accomplishable and ends the calculation of the contraction order in a case where it is determined that the estimated memory capacity is more than the reference value.

9. The information processing apparatus according to claim 8, wherein the processor executes a process of obtaining the plurality of groups by partitioning the tensor network in a procedure of the process of calculating the contraction order.

* * * * *